Patented Apr. 29, 1941

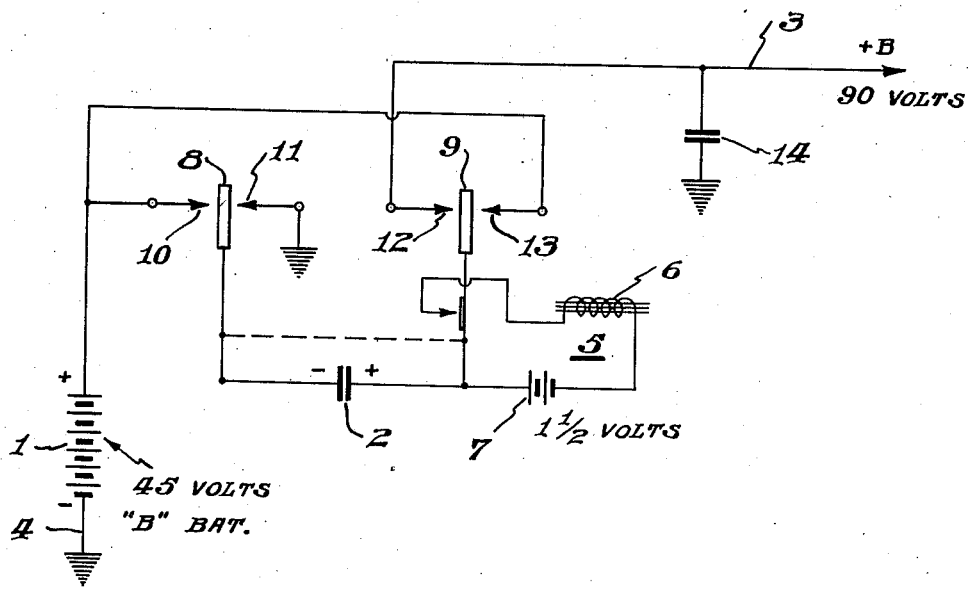

2,239,786

UNITED STATES PATENT OFFICE 2,239,786

VOLTAGE MULTIPLYING SYSTEM

Mack C. Jones, Haddon Heights, N. J., assignor to Radio Corporation of America, a corporation of Delaware Application July 28, 1939, Serial No. 287,013

2 Claims. (Cl. 171—97)

This invention relates to voltage multiplying systems such as are useful in connection with battery-operated radio receivers or the like, and has for its principal object the provision of an improved system and method of operation whereby a given voltage may be multipled or doubled efficiently and without the necessity of the relatively complicated and expensive apparatus heretofore provided for this purpose.

A characteristic feature of the invention is the provision of circuit control means so arranged as to connect a low voltage or battery source of electrical energy successively first to an energy storage means only, and second to a load circuit in series with the energy storage means, thus making available at the load circuit a voltage which is of the order of twice that of the original voltage. The method of voltage multiplication may obviously be extended to include the successive charging of a plurality of capacitors which are thereafter connected in series with one another and the voltage source to make available a voltage which is more than double that of the source.

The invention will be better understood from the following description considered in connection with the accompanying drawing, and its scope is indicated by the appended claims.

The single figure of the drawing is a wiring diagram of the improved voltage multiplying system.

This system includes a direct current, low voltage energy source 1, energy storage means shown as a capacitor 2, a load circuit indicated by the terminals 3 and 4, and an electrical vibrator which includes a winding 6 energized from a source 7 for vibrating the contact members 8 and 9, respectively, between the contacts 10—11 and the contacts 12—13. Suitable filtering means, such as a capacitor 14, may be provided in connection with the load supply terminals 3—4. In order that full voltage may be realized under load conditions, it is of course desirable that the capacitor 2 be large as compared to the capacitor 14.

It will be observed that movement of the contact members 8 and 10 to their right-hand closed position connects the capacitor 2 across the voltage source 1, thus charging the capacitor with the polarity indicated on the drawing. When the contact members 8 and 9 are moved to their left-hand closed position, however, the source 1 and the capacitor 2 are connected in series to the load supply terminals with their voltages added. The fluctuating unidirectional current delivered at the terminals 3—4 is, of course, rendered less unsteady by the filtering action of the capacitor 14, which tends to shunt out the alternating component of the current.

I claim as my invention:

1. A voltage multiplying system comprising, in combination, means providing load supply terminals, an electrical vibrator device having a pair of vibrating contact members, an energy storing capacitor connected between said contact members, a pair of contacts associated with each of said vibrating contact members providing connection therewith alternately, means providing a supply circuit for applying direct current energy between one pair of said contacts, means providing connections for the remaining pair of said contacts with one side of said supply circuit and with one of said load supply terminals, and means providing a connection between the opposite side of said supply circuit and the other terminal of said load circuit.

2. A voltage multiplying system comprising, in combination, means providing load supply terminals, an electrical vibrator device having a pair of vibrating contact members, an energy storing capacitor connected between said contact members, a pair of contacts associated with each of said vibrating contact members providing connection therewith alternately, means providing a supply circuit for applying direct current energy between one pair of said contacts, means providing connections for the remaining pair of said contacts with one side of said supply circuit and with one of said load supply terminals, means providing a connection between the opposite side of said supply circuit and the other terminal of said load circuit, and a filter capacitor connected in shunt across said load supply terminals having a relatively low capacity with respect to the capacity of said first named capacitor.

MACK C. JONES.